United States Patent
Moghaddam

(10) Patent No.: US 9,488,392 B2
(45) Date of Patent: Nov. 8, 2016

(54) THIN FILM-BASED COMPACT ABSORPTION COOLING SYSTEM

(71) Applicant: UNIVERSITY OF FLORIDA RESEARCH FOUNDATION, INC., Gainesville, FL (US)

(72) Inventor: Saeed Moghaddam, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 252 days.

(21) Appl. No.: 14/353,391

(22) PCT Filed: Oct. 25, 2012

(86) PCT No.: PCT/US2012/061827
§ 371 (c)(1),
(2) Date: Apr. 22, 2014

(87) PCT Pub. No.: WO2013/063210
PCT Pub. Date: May 2, 2013

(65) Prior Publication Data
US 2014/0238072 A1 Aug. 28, 2014

Related U.S. Application Data

(60) Provisional application No. 61/551,196, filed on Oct. 25, 2011.

(51) Int. Cl.
*F25B 15/00* (2006.01)
*F25B 37/00* (2006.01)
(Continued)

(52) U.S. Cl.
CPC ............... *F25B 15/00* (2013.01); *F25B 37/00* (2013.01); *F28D 3/02* (2013.01); *F28D 21/0015* (2013.01); *F25B 17/02* (2013.01); *F25B 2315/00* (2013.01); *Y02B 30/62* (2013.01)

(58) Field of Classification Search
CPC .... F25B 15/00; F25B 2315/00; F25B 17/02; F25B 27/00; F25B 33/00; F25B 37/00; F28D 21/0015; F28D 3/02
See application file for complete search history.

(56) References Cited

U.S. PATENT DOCUMENTS 4,205,529 A * 6/1980 Ko ................... F24F 3/1417
62/235.1
4,625,791 A * 12/1986 Lane ................. B01D 3/007
165/115

(Continued)

FOREIGN PATENT DOCUMENTS

KR 10-2011-0009517 1/2011

OTHER PUBLICATIONS

Ali, A.H.H., "Design of a compact absorber with a hydrophobic membrane contactor at the liquid-vapor interface for lithium bromide-water absorption chillers," *Applied Energy*, 2010, pp. 1112-1121, vol. 87.

(Continued)

*Primary Examiner* — Emmanuel Duke
(74) *Attorney, Agent, or Firm* — Saliwanchik, Lloyd & Eisenschenk

(57) ABSTRACT

An exchanger for absorption or desorption of a refrigerant employs an ultra thin film (UTF) of a refrigerant solution constrained to a channel by a permeable membrane. The UTF has a thickness of about 250 µm or less. The permeable membrane can be a nanostructured membrane, such as a membrane of nanofibers. The exchangers can be employed in an absorption refrigeration system (ARS) that use waste heat or solar heaters permitting the ARS to be less than one tenth the volume and mass of a conventional ARS.

8 Claims, 6 Drawing Sheets

(51) Int. Cl.
*F28D 3/02* (2006.01)
*F28D 21/00* (2006.01)
*F25B 17/02* (2006.01)

(56) References Cited

U.S. PATENT DOCUMENTS

| | | | |
|---|---|---|---|
| 4,862,708 A | 9/1989 | Basiulis | |
| 4,938,028 A * | 7/1990 | Murray | F25B 15/00 |
| | | | 62/108 |
| 5,127,234 A | 7/1992 | Woods, Jr. | |
| 5,311,931 A * | 5/1994 | Lee | C21D 1/56 |
| | | | 165/109.1 |
| 6,126,723 A | 10/2000 | Drost et al. | |
| 2005/0126211 A1 | 6/2005 | Drost et al. | |
| 2007/0269174 A1 * | 11/2007 | Caron | G01D 5/35303 |
| | | | 385/120 |
| 2011/0091711 A1 * | 4/2011 | Neivandt | B29C 39/003 |
| | | | 428/304.4 |

OTHER PUBLICATIONS

Schaal, F. et al., "Membrane Contactors for Absorption Refrigeration", *10th Aachen Membrane Colloquium*, Mar. 16-17, 2005, pp. 1-9, Aachen, Germany.

Srikhirin, P. et al., "A review of absorption refrigeration technologies," *Renewable and Sustainable Energy Reviews*, 2001, pp. 343-372, vol. 5.

* cited by examiner

Solution channel height

THIN FILM-BASED COMPACT ABSORPTION COOLING SYSTEM

CROSS-REFERENCE TO RELATED APPLICATIONS

This application is the U.S. national stage application of Internation Patent Application No. PCT/US2012/061827, filed Oct. 25, 2012, which claims the benefit of U.S. Provisional Application Ser. No. 61/551,196, filed Oct. 25, 2011, which is hereby incorporated by reference herein in its entirety, including any figures, tables, or drawings.

This invention was made with government support under contract #00077514 awarded by the Advance Research Project Agency (ARPA-E). The government has certain rights in the invention.

BACKGROUND OF INVENTION

Since the end of the 19th century until now, small capacity vapor compression systems have been used for most cooling applications, rather than absorption cooling systems due to their higher performance per unit cost. Absorption cooling systems trace their origins to the 1700's when it was observed that ice could be produced by evaporation of pure water from a vessel contained within an evacuated container in the presence of sulfuric acid. As early as 1810, ice was made by connecting a vessel containing water to a second vessel containing sulfuric acid, where by the absorption of water vapor by acid, layers of ice were formed on the water surface in the first vessel. In 1859, Ferdinand Carre introduced a refrigeration machine using water/ammonia as the working fluid for making ice and for food storage. In the 1950's, a system using lithium bromide/water as the working fluid was introduced for industrial absorption refrigeration systems (ARSs), as illustrated in FIG. 1.

In 1956, a double-effect absorption system, as illustrated in FIG. 2, was introduced and remains an industrial standard for a high performance heat-operated refrigeration cycle. A double-effect absorption refrigeration cycle supplies high temperature heat from an external source to a first-effect generator to liberate vapor refrigerant from the solution, which is condensed at high pressure in a second-effect generator where the heat rejected is used to generate addition refrigerant vapor from the concentrated solution coming from the first-effect generator. Such a configuration is considered to be a series-flow-double-effect absorption system and is a combination of two single-effect absorption systems. A single-effect absorption system is characterized by its coefficient of performance (COP). The $COP_{single}$ is the cooling effect produced from the refrigerant generated from the first-effect generator per unit of heat inputted from an external source. In a single-effect absorption system, the heat rejected from the condenser is approximately equal to the cooling capacity obtained; therefore, the heat supplied to the second generator is about equal to $COP_{single}$. The cooling effect produced from the second-effect generator is about $COP_{single}^2$ and, therefore, the COP of this double-effect absorption system is $COP_{double} = COP_{single} + COP_{single}^2$. Accordingly, a double effect absorption system has a $COP_{double}$ of about 1.2 when the corresponding single-effect system has a COP of about 0.7.

Large-scale cooling capacity ARSs have been used for many years, and only recently, driven by the goal of extracting as much energy as possible from systems where heat is generated yet cooling is desired, small-scale absorption chillers having cooling capacities of 10-15 kW have been available. However, these units generally employ shell and tube absorbers and weigh about 400 kg or more, and hence are generally restricted to cooling buildings with sufficient room for the ARS. The small-scale ARS can use waste heat from industrial or residential heating sources when available, or the ARS can employ solar heaters.

There remains a need to develop more compact and less expensive solar and waste heat powered ARSs with substantially greater efficiency than the existing technology has permitted. An absorber using a permeable membrane with a plate and frame absorber was modeled in Ali, *Applied Energy* 2010, 87, 1112-21. Refrigerant channel thicknesses of 1 to 4 mm were modeled, with almost no effect on heat and mass transfer areas required in the absorber. When compared to a conventional absorber, the plate and frame absorber of Ali, at its design point limits, required 2.5% greater mass transfer area but 42.7% lower heat transfer area for equivalent efficiencies, and therefore did not suggest a significant improvement in ARS size. Hence, ARS architecture with enhanced heat and mass transport processes that allow an enhancement in performance and reliability at a significantly reduced size and cost remains to be realized.

BRIEF SUMMARY

An embodiment of the invention is directed to an exchanger where an ultra thin liquid film (UTF) of a refrigerant solution is constrained to a channel by a permeable membrane that allows refrigerant to be absorbed or desorbed through the permeable membrane. The UTF is 250 μm or less in thickness. In embodiments of the invention the permeable membrane can be a nano-structured membrane, for example, a membrane of hydrophobic nanofibers.

Another embodiment of the invention is an absorption refrigeration system (ARS) that includes at least one exchanger employing an UTF, as disclosed above. The ARS can use available waste heat or include a solar heater. The ARSs, which include the UTFs, can permit a significant reduction in the size and cost of the ARS relative to conventional ARS systems for the same amount of cooling capacity, yet at the same time display improved reliability because of the reduction in the number of components, such as sprayers, that are required for operation.

DETAILED DISCLOSURE

Embodiments of the invention are directed to absorption refrigeration systems (ARSs) and the absorbers and/or generators comprising a refrigerant exchanger comprising at least one ultra thin liquid film (UTF) constrained on at least one surface by a highly permeable membrane, through which the refrigerant in the liquid film can be absorbed or desorbed. By employing an ultra thin film, the heat and mass transfer processes of exchangers are enhanced for an ARS. These exchangers account for the majority of an ARS's volume and weight. The UTFs of the ARSs, according to an embodiment of the invention, are about 250 μm or less in thickness. The UTFs permit significantly improved heat and mass transport, relative to state of the art systems where the hydrodynamics of falling films over tubes lead to the formation of thick liquid films that impede transport processes.

Figure 1:
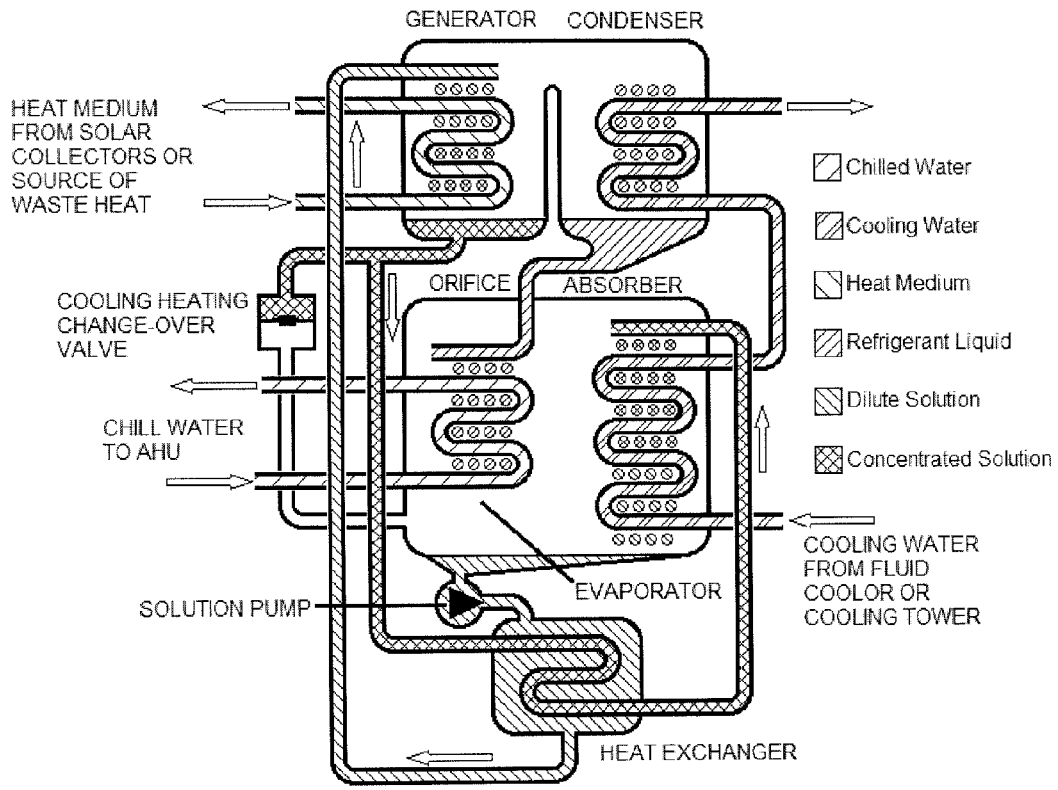
FIG. 1 shows a schematic of a prior art single-effect system.
Figure 2:
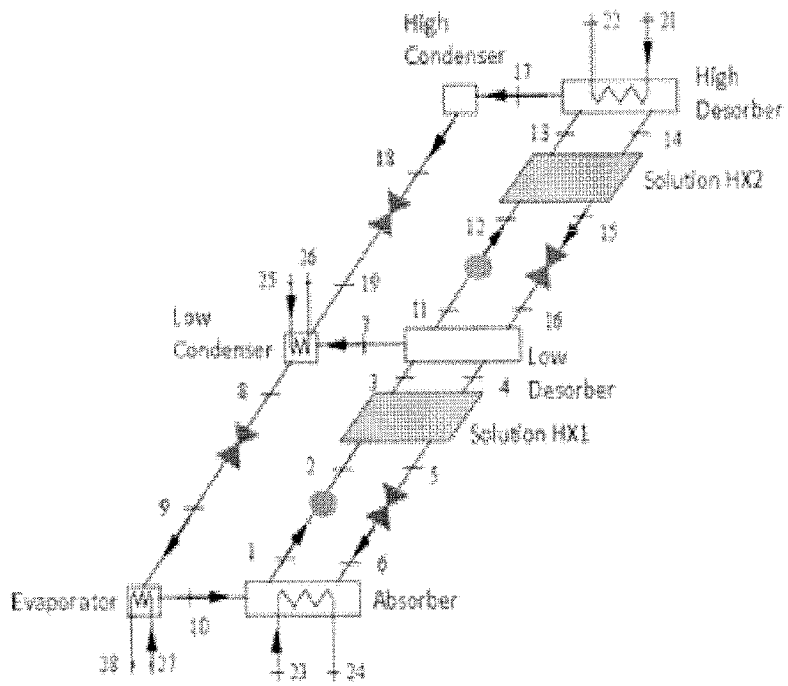
FIG. 2 shows a schematic of a prior art double-effect system.
Figure 3:
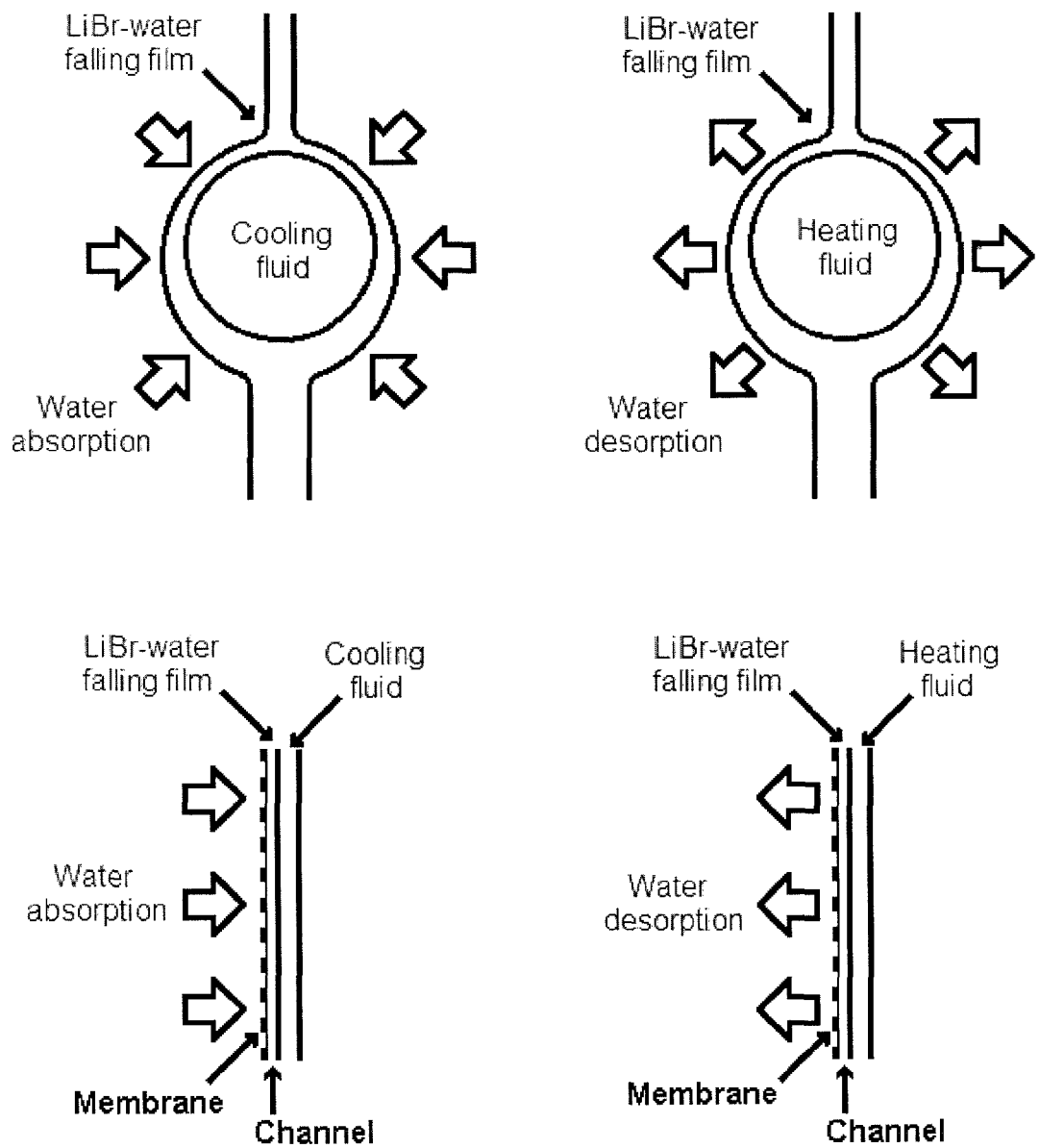
FIG. 3 shows: (top) a drawing of a refrigerant solution layer draining about a prior art horizontal tube exchanger in an absorption mode (left) and a desorption mode (right); and bottom) an UTF exchanger, according to an embodiment of the invention, in an absorption mode (left) and a desorption mode (right).

The difference between a conventional horizontal tube absorbent solution film and a membrane based UTF absorbent solution, according to embodiments of the invention, for use in the ARS's absorber or generator, is illustrated in FIG. 3. The horizontal tube absorbent solution film has a thickness that is determined by the hydrodynamics of the falling film over the tubes, which is not an optimal thickness for maximal absorption and desorption of the refrigerant. The absorbers and/or generators, according to embodiments of the invention, employ membrane covered UFTs that have imposed dimensions with high surface area to volume ratios, which are optimal for absorption and desorption of the refrigerant.

The absorbent UTF is mechanically constrained by a porous membrane that allows rapid transport of the refrigerant through the membrane. In an embodiment of the invention, the membrane is a nanostructured membrane that is positioned over a surface cooled or heated by the system cooling or heating liquid, respectively. In an embodiment of the invention, the membrane surface has a low affinity for the absorbent solution. In an embodiment of the invention, the membrane contacting a polar absorbent solution, for example, an aqueous solution, is porous and hydrophobic, such that the aqueous solution is excluded from the channels or pores of the membrane. Although water has many attractive properties for use as the refrigerant in an ARS, according to an embodiment of the invention, other refrigerants can be employed as needed or desired for the conditions under which the system is to be employed. For example, an ARS for a vehicle that may experience temperatures where freezing of water may occur when the ARS is not in use can benefit from the use of other refrigerants that possess lower freezing points.

Figure 4:
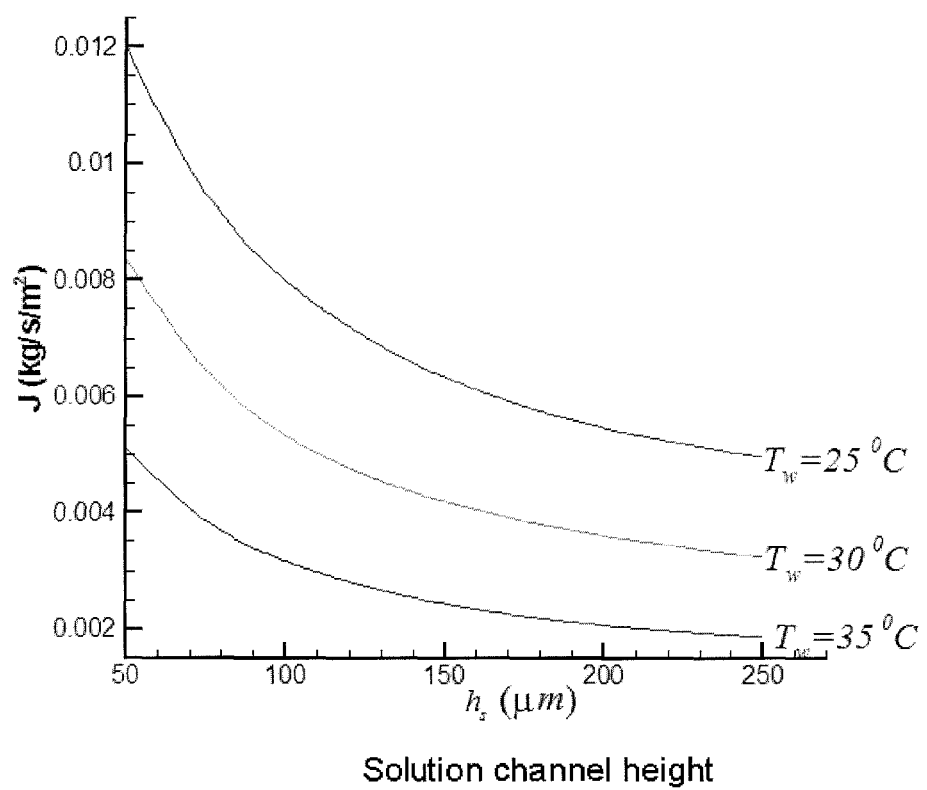
FIG. 4 shows a plot of modeled absorption rates of an exchanger, according to an embodiment of the invention, as a function of UFT thickness at different temperatures.
Figure 5:
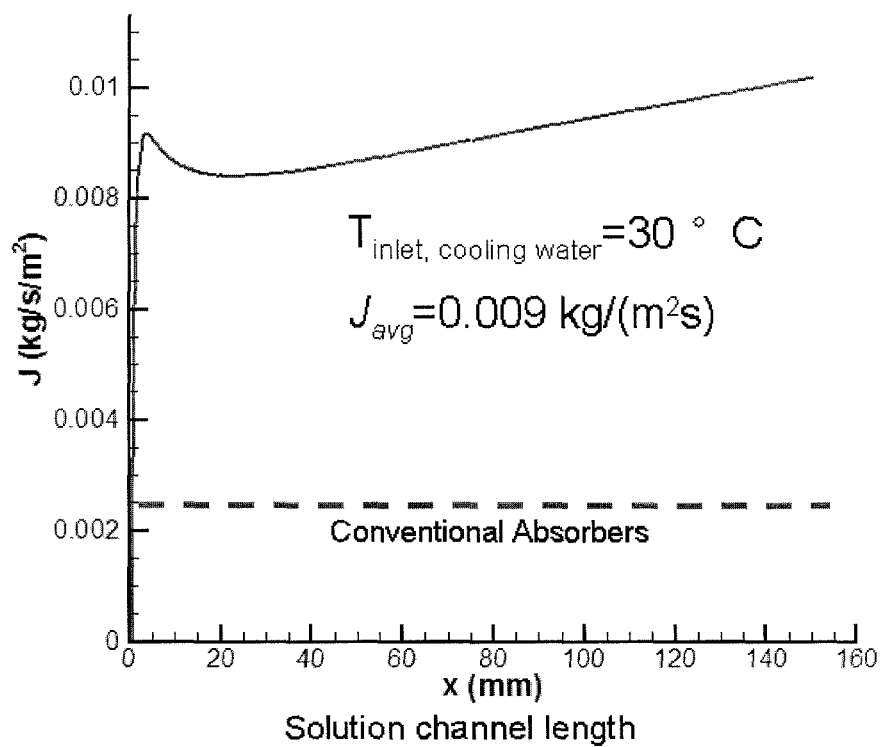
FIG. 5 shows a plot of modeled absorption rates of an exchanger, according to an embodiment of the invention, for a fixed UFT thickness of 50 microns at 30° C. as a function of channel length.
Figure 5:
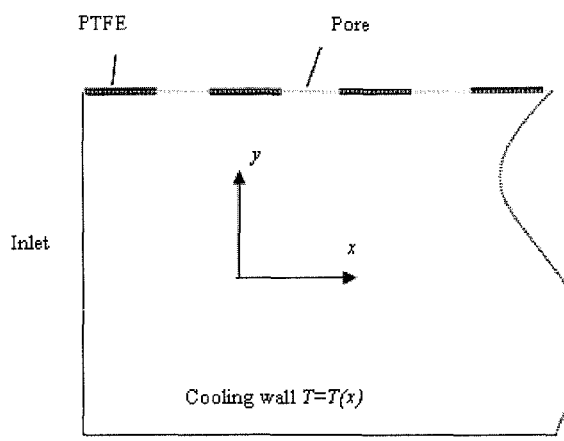
Figure 6:
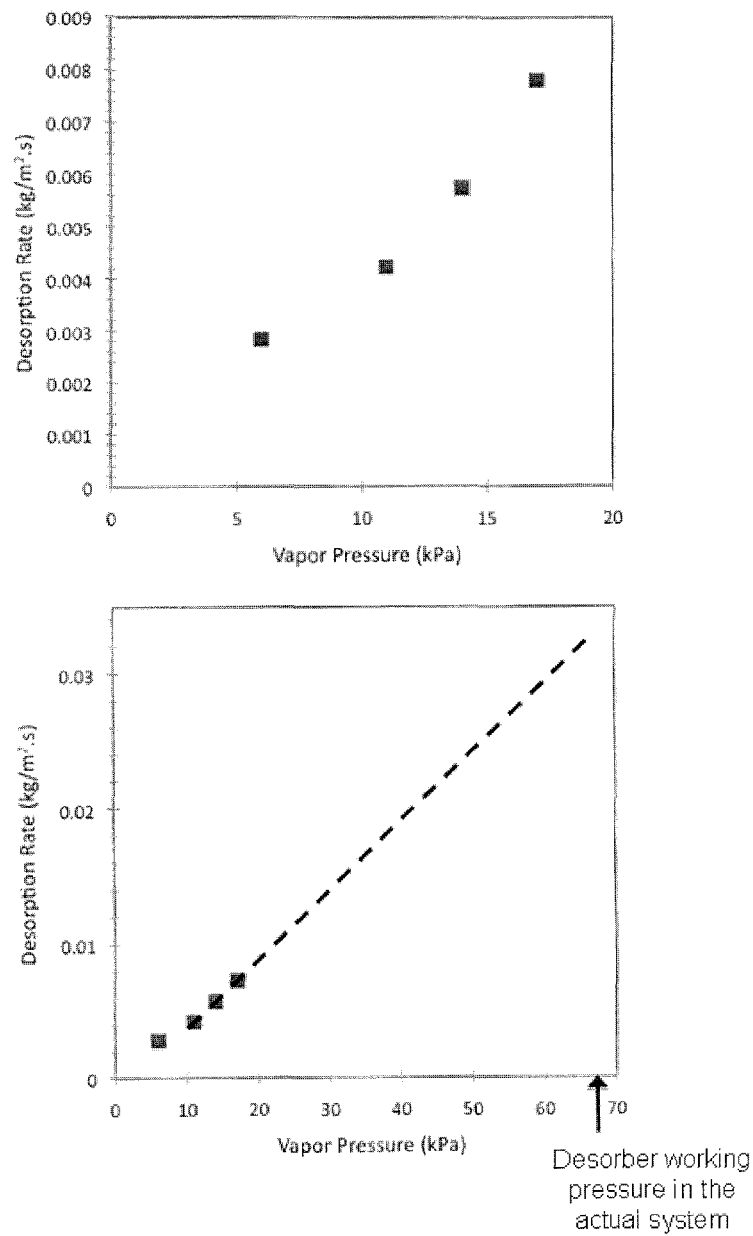
FIG. 6 shows plots of desorption rate as a function of refrigerant vapor pressure (top) in an exemplary laboratory scale exchanger, according to an embodiment of the invention, at a solution flow rate of 0.6 kg/hr for an aqueous LiBr solution at an inlet velocity of 2 cm/s at low vapor pressures, which (bottom) upon extrapolation to the working vapor pressure indicates that a rate of desorption equivalent to a 5 ton ARS can be achieved from a 0.4×0.4×0.01 m³ exchanger.
Figure 7:
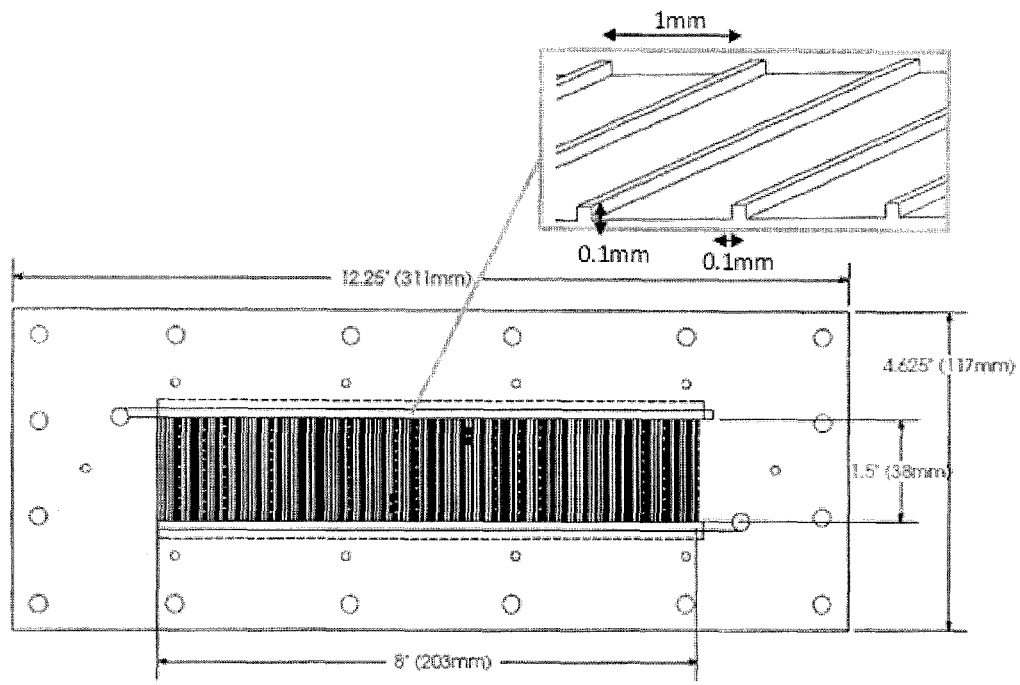
FIG. 7 shows the dimensions of the exemplary laboratory exchanger, according to an embodiment of the invention.

As can be seen in FIG. 4, 1-D modeling indicates that absorbance rates, as a function of film thickness, are not significantly improved until the film thickness is less than 250 μm. For example, relative to a 250 μm film, 200, 150, 100, and 50 μm films display an absorption rate improvement of about 13, 28, 60 and 155%, respectively at a temperature of 35° C. FIG. 5 shows plots of 3-D modeling results for absorption rates using an absorber cooled to 30° C. and an UTF of about 50 μm as a function of channel length verses the rate for a conventional absorber. As shown in FIG. 5, it is reasonable to anticipate a performance improvement of four fold or more by using an ARS, according to an embodiment of the invention. Desorption rates from a LiBr solution are displayed in FIG. 6, for a laboratory scale exchanger having the dimensions shown in FIG. 7. As can be seen in FIG. 6, extrapolation of the rate to the working vapor pressures of a conventional ARS, about 68 kPa, implies that a generator having dimensions of 0.4×0.4× 0.01 m³ can be as effective as a conventional 5 ton system. ARSs, according to embodiments of the invention, can be one to two orders of magnitude smaller and lighter than conventional ARSs with similar cooling capacities.

Figure 8:
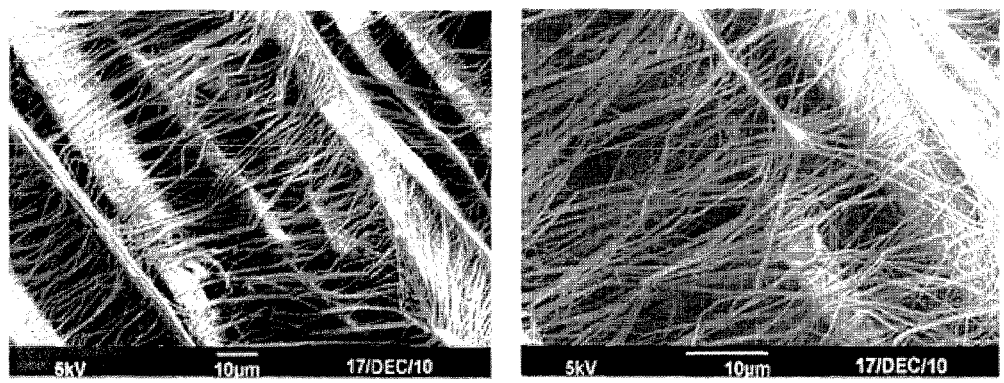
FIG. 8 shows a SEM image of a nanofiberous poly (tetrafluoroethylene) porous filter employed in the exemplary laboratory exchanger, according to an embodiment of the invention.

In an embodiment of the invention, the porous membrane is a fibrous membrane. The use of a highly porous membrane allows minimum diffusion resistance for the passage of a vapor phase refrigerant through the membrane and into the UTF absorbent. In like manner, according to an embodiment of the invention, a UTF is employed in the exchanger of the generator to greatly enhance vapor desorption from the absorbent solution. The desorbed refrigerant passes through a nanostructured membrane and condenses over an enhanced surface cooled by the system's coolant. The membrane need not be porous if the nature of the material allows for a sufficiently rapid diffusion through the material under the conditions of use of the ARS. The membrane may be one that remains saturated in the refrigerant, yet allows an active diffusion of the refrigerant to the absorbent solution. In an exemplary embodiment of the invention, for use with an aqueous absorber solution, the membrane comprises fibrous polytetrafluoroethylene, as illustrated in FIG. 8, where scanning electron microscope images indicate that membranes of nanometer diameter fibers provide a surface that is extremely porous and rough. This allows rapid refrigerant exchange over a rough membrane that has a very high area surface.

An ARS, according to an embodiment of the invention, does not employ large shell and tube heat exchangers, as do state of the art ARSs. Additionally, according to an embodiment of the invention, the small flat panel heat exchangers eliminate the entire spray systems of nozzles, associated pumps, and control system that are required in conventional ARSs. According to an embodiment of the invention, the use of UTFs reduces the approach temperatures throughout the system heat exchangers, which provides higher performance for a given temperature budget, the temperature difference between high and low temperature sources.

ARSs, according to embodiments of the invention, require little maintenance because of: lower air penetration into the low volume system; fewer metal surfaces available for corrosion; and elimination of the spray nozzle failure that is caused by fine corrosion formed particles. The nature of the materials that are used can further enhance the reliability and efficiency of the system, while lowering the mass of the system. For example, non-metallic materials and composites with sufficiently high thermal conductivity can allow the replacement of metals with lower weight materials for the components of the ARSs with little or no sacrifice of the rate of heat transfer. Replacement of metal components with materials of lower thermal conductivity can also be employed to achieve a higher surface area to volume ratio, which allows sufficient heat transfer for good functioning of the exchangers employed.

According to an embodiment of the invention, the heating source for the ARSs can be waste heat and/or a solar or geothermal heating source. A solar powered ARS, according to an embodiment of the invention, can be used in a building; waste heat from industrial process can employ the ARSs to cool buildings within the vicinity of waste heat source. For example, an ARS for use in a vehicle with a combustion engine can employ the heat from the exhaust system as the heating source. The same vehicle can include a system of collecting solar heat, and possibly include a photovoltaic cell on its surface for operating pumps and controlling systems that permit, for example, cooling of the vehicle when parked in full sun and not under power of the engine.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

I claim:

1. An exchanger, comprising an ultra thin liquid film (UTF) of a refrigerant solution constrained in a channel by a permeable membrane wherein refrigerant is absorbed or desorbed through the permeable membrane.

2. The exchanger of claim 1, wherein the UTF is 250 μm or less in thickness.

3. The exchanger of claim 1, wherein the refrigerant solution is an aqueous solution.

4. The exchanger of claim 1, wherein the permeable membrane is a nano-structured membrane.

5. The exchanger of claim 4, wherein the permeable membrane comprises a plurality of nanofibers.

6. The exchanger of claim 5, where the nanofibers comprise polytetrafluoroethane.

7. An absorption refrigeration system (ARS), comprising at least one exchanger according to claim 1.

8. The ARS of claim 7, further comprising a solar heater.

* * * * *

UNITED STATES PATENT AND TRADEMARK OFFICE
CERTIFICATE OF CORRECTION

PATENT NO. : 9,488,392 B2
APPLICATION NO. : 14/353391
DATED : November 8, 2016
INVENTOR(S) : Saeed Moghaddam It is certified that error appears in the above-identified patent and that said Letters Patent is hereby corrected as shown below:

In the Specification

Column 1,
Line 14, "contract #00077514" should read --contract DE-AR0000133--.
Lines 44-45, "generate addition" should read --generate additional--.

Signed and Sealed this
Twenty-fourth Day of April, 2018

Andrei Iancu
*Director of the United States Patent and Trademark Office*